United States Patent [19]

Czarnocki

[11] Patent Number: 5,193,393
[45] Date of Patent: Mar. 16, 1993

[54] PRESSURE SENSOR CIRCUIT

[75] Inventor: Walter S. Czarnocki, Schaumburg, Ill.

[73] Assignee: Motorola, Inc., Schaumburg, Ill.

[21] Appl. No.: 653,197

[22] Filed: Feb. 4, 1991

[51] Int. Cl.⁵ .............................................. G01L 19/04
[52] U.S. Cl. ........................................ 73/708; 73/766; 73/862; 73/623; 324/105; 324/721
[58] Field of Search ................. 73/706, 708, 717, 718, 73/719, 720, 721, 722, 861.47, 862.35, 862.48, 862.58, 862.63, 862.65, 862.67; 338/3, 4; 324/105, 721

[56] References Cited
U.S. PATENT DOCUMENTS
4,798,093 1/1989 Kenoun ................................. 73/708

OTHER PUBLICATIONS

Nippondenso PRT Circuit Schematic.
Delco PRT Circuit Schematic.
Motorola PRT Circuit Schematic.

*Primary Examiner*—Donald O. Woodiel

[57] ABSTRACT

A pressure sensor circuit (10A) is disclosed which preferably utilizes a piezoresistive pressure transducer (11A) having a substantial temperature coefficient of resistance to provide an inherent temperature variation which is used to implement offset temperature compensation for the circuit. Two operational amplifiers (OA1, OA2) are configured along with selectable resistors ($R_1$, $R_9$, $R_7$, $R_8$, $R_5$, $R_6$ and $R_4$) to implement four adjustments of the circuit (10A) to adjust span (gain), offset and temperature variation of both span and offset to achieve a desired result. All this is achieved while implementing a common mode gain for the circuit (10A) which is less than 5 and preferably no more than 2.

24 Claims, 1 Drawing Sheet

PRESSURE SENSOR CIRCUIT

FIELD OF THE INVENTION

The present invention relates to the field of pressure sensor circuits in which a sensed pressure results in a corresponding electrical signal having a desired sensed pressure versus electrical signal transfer characteristic. More specifically, the present invention relates to a pressure resistive sensor providing a pair of output sensor signals with the difference between these signals related to the magnitude of sensed pressure and an adjustment circuit means for processing these output sensor signals to provide a desired output signal having a desired magnitude variation as a function of sensed pressure and temperature.

BACKGROUND OF THE INVENTION

Previously, pressure resistive sensors have been used to provide a pair of output sensor signals with the difference between these signals being related to the magnitude of sensed pressure. Typically, an adjustment circuit receives these sensor signals and provides four separate adjustments for controlling the variation of a desired pressure related output signal, derived from the pair of sensor signals, with respect to pressure and temperature. For zero applied pressure, the difference between the sensor output signals should be zero and this difference should be maintained despite temperature variations. However, sensor construction results in differences between the sensor output signals which are not due to sensed pressure, and these differences may have both temperature dependent and absolute difference (temperature independent) components. Thus prior circuits have typically provided separate adjustments for the absolute (temperature independent) and temperature dependent variation of the "offset" of the desired output signal due to the existing nonpressure related difference between the sensor output signals. In addition, typically sensor circuits should provide a desired known range for an output signal voltage which corresponds to a desired variation of sensed pressure. This is typically referred to as "span" and generally corresponds to the gain implemented by the adjustment circuit with regard to the output pressure related signal of the circuit and the difference between the two sensor output signals. In addition, this span has its own temperature variation which should be compensated for.

The bottom line is that there are generally four separate adjustments, span, offset, and temperature variation of span and offset, which are implemented by a pressure sensor adjustment circuit. Some prior pressure sensor circuits have implemented all four of these adjustments, but have done so while inherently providing a substantial common mode gain. This "common mode gain" means that even if the difference between the two sensor output signals is related to only pressure, an equal variation of both of these signals will not cancel out, and that will result in a variation of the desired output signal. It has been found that for some pressure sensors long term drift in the same direction for both of the pair of sensor output signals may result. With a high common mode gain, this results in a substantial and undesired variation of the magnitude of the desired output signal such that the output signal no longer has a direct calibrated correspondence to sensed pressure even though all four of the previously mentioned adjustments were made when the sensor circuit was originally calibrated. Some prior sensor circuits have provided a very low common mode gain, but this has been accomplished by the use of more than three operational amplifiers to obtain the needed isolation of various signals. Other sensor circuits have utilized only one operational amplifier, but they have been unable to provide sufficient isolation of sensor signals to perform all four of the needed adjustments while minimizing common mode gain. Typically, such a single operational amplifier circuit is difficult to adjust since several of the needed four adjustments affect common mode unbalance.

A sensor circuit using two operational amplifiers has been provided and is shown in FIG. 1. This prior art circuit is capable of implementing all four needed adjustments. However, this circuit has a common mode gain of approximately 20. For small long term common mode drift of the pair of sensor output signals, this resulted in an unacceptable variation of the output signal of the sensor circuit. While various passivations for the pressure sensor itself tend to minimize the amount of long term drift, this does not eliminate the problem to a sufficient extent.

OBJECTS OF THE INVENTION

An object of the present invention is to provide an improved pressure sensor circuit which overcomes the above noted disadvantages of prior pressure sensor circuits.

A more specific object of the present invention is to provide an improved pressure sensor circuit having a common mode gain of less than five while minimizing the cost of such a pressure sensor circuit.

An additional object of the present invention is to provide an improved pressure sensor circuit having a specific circuit configuration which utilizes only two operational amplifiers and provides for implementing all four of the needed signal adjustments while minimizing common mode gain.

BRIEF DESCRIPTION OF THE DRAWINGS

The present invention can be better understood by reference to the drawings in which.

DESCRIPTION OF THE PREFERRED EMBODIMENTS

Figure 1:
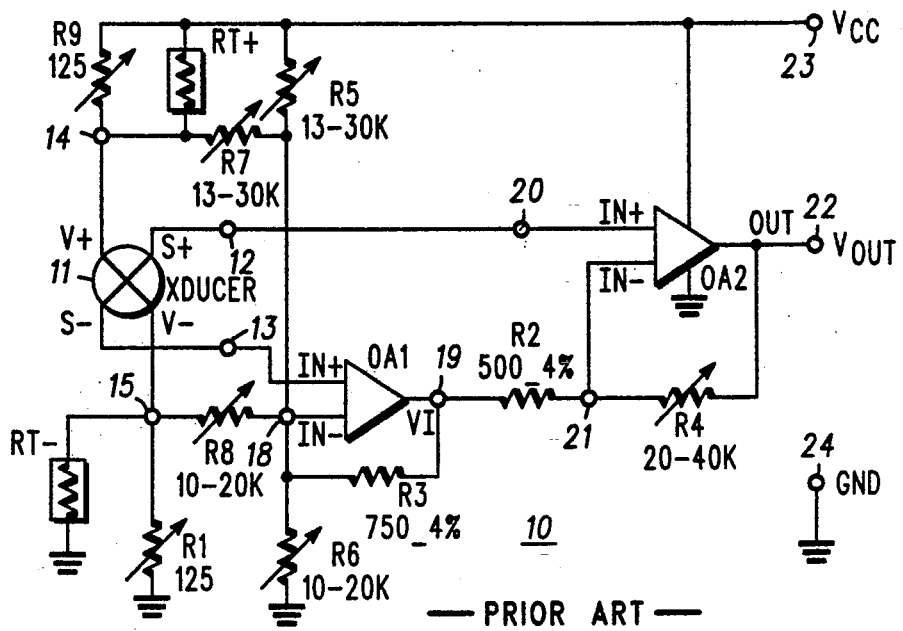
FIG. 1 is a schematic diagram of a prior art pressure sensor circuit.

Referring first to the prior art circuit configuration shown in FIG. 1, a pressure sensor circuit 10 is illustrated. The circuit includes a pressure transducer, or pressure sensing element, 11 for sensing pressure and in response thereto providing a first sensor voltage signal S+ and a second voltage sensor signal S− at first and second output terminals 12 and 13 of the sensor 11. The differential voltage between the sensor signals S+ and S− is related to sensed pressure.

Figure 2:
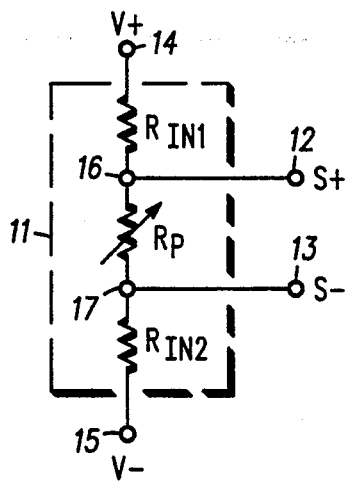
FIG. 2 is a schematic diagram of an equivalent electrical circuit for a pressure sensing element.

Preferably, the sensor 11 is a piezoresistive pressure sensor in which an equivalent pressure variable resistor $R_p$ varies in accordance with sensed pressure. FIG. 2 illustrates a typical equivalent circuit for such a pressure sensor 11 with the pressure variable resistor $R_p$ being connected in series with non-pressure variable resistors $R_{IN1}$ and $R_{IN2}$ between terminals 14 and 15, separate from the terminals 12 and 13, across which a differential applied voltage of $V^+$"$V^-$ is applied. While a series equivalent circuit for the sensor 11 is shown in FIG. 2, another way of schematically illustrating the equivalent circuit of the sensor 11 would be to illustrate a bridge configuration. In such a bridge circuit a pair of pressure independent resistors are connected with a pair of pressure variable resistors with a voltage differential of $V^+$ to $V^-$ being applied across the bridge and the bridge providing a differential output of $S^+ - S^-$ across output terminals 12 and 13. Regardless of which equivalent circuit is utilized to depict the pressure sensor 11, the operation of the circuit 10 is identical.

Referring again to FIG. 1, the sensor voltage signal $S^-$ is directly connected to a non-inverting input $IN^+$ of a first operational amplifier OA1. The terminal 15 at which the applied voltage $V^-$ is provided at is connected through an adjustable resistor $R_8$ to a terminal 18 which is an inverting input $IN^-$ of the operational amplifier OA1. The output of the first operation amplifier is provided at a terminal 19 which is connected through a negative feedback resistor $R_3$ to the terminal 18 and through a resistor $R_2$ to a terminal 21. The signal at the terminal 19 is designated as VI to indicate that this is an intermediate voltage signal provided at this terminal which is related to the sensor output voltage signal $S^-$. The terminal 18 is connected to ground through a variable resistor $R_6$ and is connected to a positive source of fixed voltage potential $V_{cc}$ at a terminal 23 through a variable resistor $R_5$. The terminal 15 is connected to ground through the parallel combination of an adjustable resistor $R_1$ and a negative temperature coefficient thermistor $RT^-$. The terminal 14 is connected to the terminal 18 through a variable resistor $R_7$ and is connected to the terminal 23 through the parallel combination of a variable resistor $R_9$ and a thermistor $RT^+$.

In circuit 10, the sensor output signal $S^+$ at the terminal 12 is connected to a terminal 20 corresponding to the non-inverting input $IN^+$ of a second operational amplifier OA2 which has its inverting input $IN^-$ directly connected to the terminal 21. The output of the second operational amplifier OA2 is provided at an output terminal 22 which is connected by means of a variable feedback resistor $R_4$ to the terminal 21. The signal at the terminal 22 is designated as $V_{out}$ and has a desired pressure and temperature variation characteristic. The sensor 11 shown in FIG. 1 is a piezoresistive sensor having a temperature coefficient of resistance for its pressure variable and nonpressure variable resistors of less than 0.30% per degree C., and in actuality having a temperature coefficient resistance of 0.27% per degree C. FIG. 1 indicates typical values, in ohms, for the resistors of circuit 10. The alphabetic designation K for a resistor value indicates a multiplier of 1,000. The operation of the prior art circuit 10 will now be discussed.

The circuit 10 implements all four of the needed signal adjustments such that the output signal $V_{out}$ has a desired pressure and temperature variation. However, this circuit configuration implements a common mode gain of 20 and therefore is subject to errors due to common mode variation of the pair of sensor output signals $S^+$ and $S^-$. The present invention will reconfigure the circuit configuration shown in FIG. 1 so as to overcome this problem.

For the circuit 10, the resistors $R_9$ and $R_1$ are utilized to selectively adjust the temperature coefficient of the span (gain) of the circuit 10. One of the resistors $R_7$ and $R_8$ is used to adjust the temperature coefficient of the offset for the output signal $V_{out}$ due to any non-pressure related difference between the signals $S^+$ and $S^-$. This is referred to as the temperature coefficient offset adjustment. The variable resistor $R_4$ is utilized to adjust the absolute value of the span or gain of the circuit 10. The resistors $R_5$ and $R_6$ are utilized to adjust the absolute value of the offset of this circuit.

While the circuit configuration shown in FIG. 1 performed satisfactorily in the absence of common mode drift for the sensor 11, the circuit did not function as well when such drift was present because it implemented a common mode gain of approximately 20. It can be shown that the transfer function for the circuit 10 can be approximately represented by the equation:

$$V_{out} = \frac{R_4}{R_2}(S^+ - S^-) + S^+ - \qquad (1)$$

$$\frac{R_4}{R_2}\left(\frac{R_3}{R_5} + \frac{R_3}{R_6} + \frac{R_3}{R_7} + \frac{R_3}{R_8}\right)S^- +$$

$$\frac{R_4}{R_2}\left(\frac{R_3}{R_7}V^+ + \frac{R_3}{R_8}V^-\right)$$

For a common mode gain of zero, the voltage $V_{out}$ should only be a function of the difference between $S^+$ and $S^-$, since any equal shift of $S^+$ and $S^-$ in the same direction should cancel out. Equation 1 illustrates that for circuit 10 to achieve a common mode voltage gain of zero, which is a desired condition, the following equality must be achieved since $V^+$ and $V^-$ do not change significantly for expected variations of $S^+$ and $S^-$:

$$1 = \frac{R_4}{R_2}\left(\frac{R_3}{R_5} + \frac{R_3}{R_6} + \frac{R_3}{R_7} + \frac{R_3}{R_8}\right) \qquad (2)$$

However, the condition of equation 2 is not feasible to achieve since the ratio of resistors $R_4$ to $R_2$ must be substantial to achieve a reasonable gain for the circuit and the right side of equation 2 must be approximately 20 in order to allow proper adjustment for offset for the signal $V_{out}$. In addition, another shortcoming of the prior art circuit 10 is that it requires the use of thermistors $RT^+$ and $RT^-$. These components represent additional circuit components and therefore represent an additional cost in parts and assembly.

Figure 3:
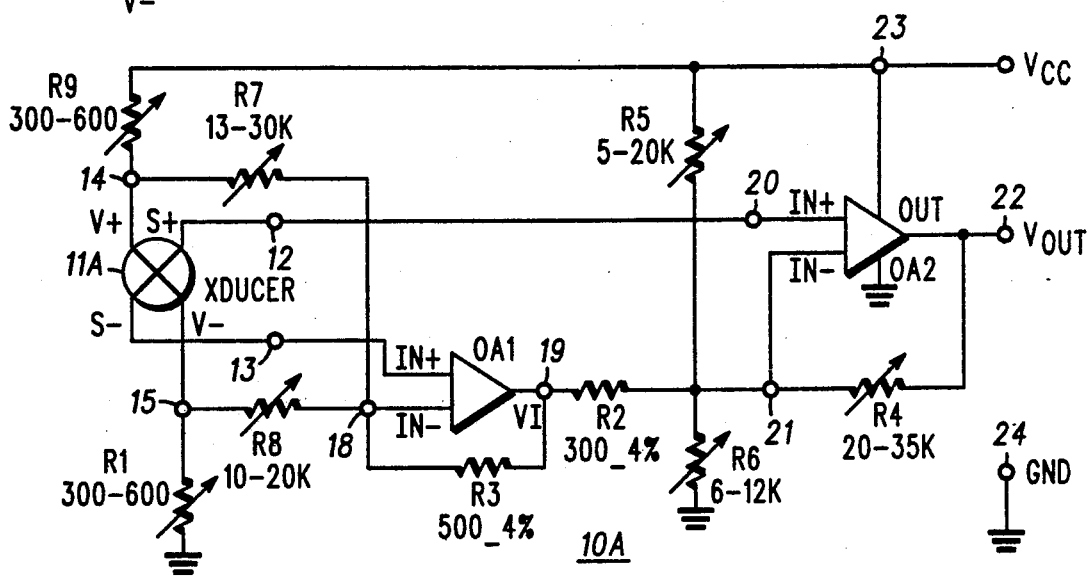
FIG. 3 is a schematic diagram of a pressure sensor circuit constructed in accordance with the present invention.

To overcome the deficiencies of the prior art circuit 10 shown in FIG. 1, an improved sensor circuit 10A as shown in FIG. 3 was implemented. The improved circuit configuration 10A utilizes a piezoresistive pressure transducer 11A wherein now the temperature coefficient of resistance of the resistors of this transducer is substantial. This substantial coefficient is more than 0.30% per degree C. and in actuality is 0.35% per degree C. indicating a 25% higher temperature coefficient of resistance than the transducer 11. The piezoresistive transducer 11A is implemented by using different doping levels of boron in the manufacture of the pressure transducer. It should be noted that in both of the transducers 11 and 11A a typical value for the pressure variable resistor $R_p$ is somewhere between 3 and 10 ohms over the range of pressures being measured whereas the fixed resistors $R_{IN1}$ and $R_{IN2}$ are both approximately 220 ohms. This therefore indicates the need for a substantial gain which must be implemented by the remaining circuitry to produce a measurable variation in the output signal $V_{out}$ as a function of pressure.

In addition to the circuit 10A utilizing the transducer 11A rather than the transducer 11, there are no thermistors provided in parallel with resistors $R_1$ and $R_9$ as shown in FIG. 3. In addition, and very significantly, the offset adjustment resistors $R_5$ and $R_6$ are now no longer connected to the terminal 18 but are now connected to the terminal 21. Except for these changes, and the fact that the resistors shown in FIG. 3 now have somewhat different nominal values as indicated in FIG. 3, the circuitry of the circuit 10A is identical to that of the circuit 10 shown in FIG. 1. However, now the transfer characteristic for the voltage $V_{out}$ for the circuit 10A is approximately expressed by the following equation 3 which is:

$$V_{out} = \frac{R_4}{R_2}(S^+ - S^-) - \frac{R_4}{R_5}V_{CC} + \quad (3)$$

$$\frac{R_4}{R_2}\left(\frac{R_3}{R_7}V^+ + \frac{R_3}{R_8}V^-\right) +$$

$$\left(1 + \frac{R_4}{R_5} + \frac{R_4}{R_6}\right)S^+ - \frac{R_4}{R_2}\left(\frac{R_3}{R_7} + \frac{R_3}{R_8}\right)S^-$$

Because of this new transfer function for the circuit 10A, as expressed above, in order to implement a common mode gain of zero, the condition of the following equation must be met since $V^+$ and $V^-$ do not change significantly for variations of $S^+$ and $S^-$:

$$\left(1 + \frac{R_4}{R_5} + \frac{R_4}{R_6}\right) = \frac{R_4}{R_2}\left(\frac{R_3}{R_7} + \frac{R_3}{R_8}\right) \quad (4)$$

By choice of the magnitude of resistors $R_2$ and $R_3$ for typical values of the other resistors, this condition can be met to a very close degree such that a common mode gain of less than 5 and preferably no more than 2, and in fact of no more than 1.5, can be readily implemented. This occurs because the resistors $R_5$ and $R_6$, because of their present positioning, now provide an effect for the amplification of the signal $S^+$ with respect to the transfer characteristic so as to potentially cancel the effect of resistors $R_4$, $R_2$, $R_3$, $R_7$ and $R_8$ with respect to the amplification of the signal $S^-$. Thus providing the absolute offset adjustment resistors $R_5$ and $R_6$ at an input of OA2, while providing the additional temperature offset adjustment resistors $R_7$ and $R_8$ at an input of OA1 has created an improved circuit. In addition, because the transducer 11A is utilized, the temperature variation produced by the transducer 11A itself is utilized for adjustment of the temperature coefficient of offset and span by the resistors $R_1$ and $R_9$ and $R_7$ and $R_8$. This eliminates the use of additional thermistor components and therefore reduces the cost of the circuit 10A.

The method for adjusting the resistors in the circuit 10A so as to achieve the four necessary adjustments for a pressure sensor circuit is as follows.

For the circuit 10A in FIG. 3, the first adjustment to be made is for the temperature coefficient of the span (or gain) of the circuit. For this adjustment resistors $R_1$ and $R_9$ are adjusted to obtain a zero temperature variation of the output voltage gain for $V_{out}$ at two different temperatures. In practice, temperatures of 25° C. and 85° C. were selected to achieve this adjustment. Thus for a known change in pressure the change in $V_{out}$ is measured at one temperature, the temperature is changed, and one of the resistors $R_9$ or $R_1$ is adjusted to achieve the same $V_{out}$ magnitude change for the same pressure change. Subsequently, the span of the circuit 10A is adjusted at a fixed temperature by adjusting the magnitude of the resistor $R_4$ to get a desired change in output voltage versus a known change in pressure. The span adjustment assures that a proper difference or range between maximum and minimum values of the signal $V_{out}$ will occur for the expected range of pressures to be sensed. In other words a proper $\Delta V_{out}$ will result from the expected $\Delta$ pressure range.

The third circuit adjustment to be implemented is for the temperature coefficient of offset and this is achieved by adjusting one of the resistors $R_7$ or $R_8$. These resistors are adjusted such that for zero pressure at two different temperatures, such as 25° C. and 85° C., there will be zero variation of the output voltage $V_{out}$.

The fourth adjustment to be implemented is the offset adjustment for the circuit 10A and this is achieved by adjusting one of the resistors $R_5$ or $R_6$. The adjusted resistor is adjusted such that for zero sensed pressure a desired absolute magnitude of the output signal $V_{out}$ is achieved. After initially implementing the above four adjustments, it was found that there may be required an additional minor adjustment of the gain (span) by adjusting the magnitude of the resistor $R_4$ and then an additional minor adjustment of the offset by adjusting one of the resistors $R_5$ or $R_6$. With the adjustments made in the above noted sequence, the circuit 10A has been found to implement a desired pressure sensor circuit having a common mode gain of no more than two while utilizing only two operational amplifiers and having fewer components since a transducer having a substantial temperature coefficient of resistance has been utilized thus eliminating the need for thermistors as part of the circuit.

While I have shown and described specific embodiments of this invention, further modifications and improvements will occur to those skilled in the art. All such modifications, such as providing a current output signal rather than a voltage output signal $V_{out}$, which retain the basic underlying principles disclosed and claimed herein are within the scope of this invention.

I claim:

1. A pressure sensor circuit comprising:

a pressure resistive sensor means for sensing pressure and in response thereto providing first and second sensor signals at first and second sensor output terminals of said sensor means, the differential signal between said output terminals related to the magnitude of sensed pressure, and adjustment circuit means for receiving said first and second sensor signals and providing in response thereto a pressure related output signal having a desired magnitude variation characteristic as a function of pressure and temperature, said adjustment circuit means including resistive means for adjusting the span of said desired output signal as a function of pressure, the absolute offset of said output signal with respect to said first and second sensor signals, and the temperature coefficient of variation of both said offset and said span, said adjustment circuit means including at least and no more than two operational amplifiers with one of said first and second sensors signals coupled to an input of a first one of said two operational amplifiers which provides an output coupled to an input of a second one of said two operational amplifiers which provides an output corresponding to said pressure related output signal, said two operational amplifiers providing a common mode gain for said desired output signal with respect to said first and second sensor signals of less than five.

2. A pressure sensor circuit according to claim 1 wherein said common mode gain is no more than 2.

3. A pressure sensor circuit according to claim 1 wherein said adjustment circuit means includes offset adjustment resistors connected to one input terminal of one operational amplifier which receives one of said sensor signals at another input terminal of said one operational amplifier and provides at an output terminal of said one operational amplifier said desired pressure variable output signal.

4. A pressure sensor circuit according to claim 3 wherein said adjustment circuit means includes another operational amplifier which receives as an input and amplifies another of said sensor signals and has its output coupled to said one input terminal of said one operational amplifier.

5. A pressure sensor circuit according to claim 4 wherein said pressure resistive sensor means comprises a piezoresistive pressure sensor.

6. A pressure sensor circuit according to claim 5 wherein a selectable feedback resistance is connected from the output of said one operational amplifier to said one input terminal thereof for controlling the gain of said one operational amplifier, wherein offset adjustment resistor means, which comprises said offset adjustment resistors, is connected to said one input terminal of said one operational amplifier for resistively selecting a desired offset adjustment for said desired pressure related output signal with respect to said first and second sensor signals, and wherein additional adjustment resistors are connected to one of the inputs of said another operational amplifier for implementing an additional offset adjustment.

7. A pressure sensor circuit comprising:
a pressure resistive sensor means for sensing pressure and in response thereto providing first and second sensor voltage signals at first and second sensor output terminals of said sensor means, the differential voltage between said output terminals related to the magnitude of sensed pressure; and
adjustment circuit means for receiving said first and second sensor voltage signals and providing in response thereto a pressure related output signal having a desired voltage variation characteristic as a function of pressure and temperature,
said adjustment circuit means including resistive means for adjusting the span of said desired output signal as a function of pressure, the absolute offset of said output signal with respect to said first and second sensor signals, and the temperature coefficient of variation of both said offset and said span, said adjustment circuit means including at least and no more than two operational amplifiers with one of said first and second sensors signals coupled to an input of a first one of said two operational amplifiers which provides an output coupled to an input of a second one of said two operational amplifiers which provides an output corresponding to said pressure related output signal, said two operational amplifiers providing a common mode gain for said desired output signal with respect to said first and second sensor signals of less than five.

8. A pressure sensor circuit according to claim 7 wherein said common mode gain is no more than 2.

9. A pressure sensor circuit according to claim 8 wherein said adjustment circuit means includes offset adjustment resistors connected to one input terminal of one operational amplifier which receives one of said sensor voltage signals at another input terminal of said one operational amplifier and provides at an output terminal of said one operational amplifier said desired pressure variable output signal.

10. A pressure sensor circuit according to claim 9 wherein said adjustment circuit means includes another operational amplifier which receives as an input and amplifies another of said sensor voltage signals and has its output coupled to said one input terminal of said one operational amplifier.

11. A pressure sensor circuit according to claim 10 wherein said pressure resistive sensor means comprises a piezoresistive pressure sensor.

12. A pressure sensor circuit according to claim 11 wherein a selectable feedback resistance is connected from the output of said one operational amplifier to said one input terminal thereof for controlling the gain of said operational amplifier, wherein offset adjustment resistor means, which comprises said offset adjustment resistors, is connected to said one input terminal of said one operational amplifier for resistively selecting a desired offset adjustment for said desired pressure related output signal with respect to said first and second sensor voltage signals, and wherein additional adjustment resistors are connected to one of the inputs of said another operational amplifier for implementing an additional offset adjustment.

13. A pressure sensor circuit comprising:
a pressure resistive sensor means for sensing pressure and in response thereto providing first and second sensor voltage signals at first and second output terminals of said sensor means, the differential voltage between said first and second sensor voltage signals being related to sensed pressure, and
adjustment circuit means for receiving said first and second sensor voltage signals and providing in response thereto a desired pressure related output signal having a desired voltage variation characteristic as a function of pressure and temperature,
said adjustment circuit means including first and second operational amplifiers each having first and second input terminals of opposite polarity and an output terminal, said first operational amplifier receiving said second sensor voltage signal at its first input terminal and having temperature compensation adjustment resistors connected to its second input terminal for adjusting the temperature variation characteristic of said output signal, said second operational amplifier receiving said first sensor voltage signal at its first input terminal and having its second input terminal coupled to the output of said first operational amplifier for receiving the output thereof, said second operational amplifier providing at its output said desired pressure related output signal and having a selectable feedback resistance connected from its output to its second input terminal for controlling the gain of said second operational amplifier, and offset adjustment resistor means connected to said second input terminal of said second operational amplifier for resistively selecting a desired offset adjustment for said pressure related output signal with respect to said first and second sensor voltage signals.

14. A pressure sensor circuit according to claim 13 wherein said pressure resistive sensor means comprises a piezoresistive pressure sensor.

15. A pressure sensor circuit according to claim 14 wherein said piezoresistive pressure sensor has positive and negative applied voltage input terminals, separate from said first and second sensor output terminals, for having a voltage applied thereacross, said piezoresistive sensor effectively including at least one pressure variable resistance and a pair of non-pressure variable resistances which determine said sensor voltage signals.

16. A pressure sensor circuit according to claim 15 wherein said piezoresistive sensor comprises a piezoresistive sensor having a temperature coefficient of resistance for its pressure variable and non-pressure variable resistances of more than 0.30% per degree C. as opposed to a piezoresistive sensor having a temperature coefficient of resistance of less than 0.30% per degree C.

17. A pressure sensor circuit according to claim 16 which includes a first selectable non-temperature variable resistance connected between a voltage potential and said first sensor applied voltage input terminal and a second non-temperature variable selectable resistor connected between another different voltage potential and said second sensor applied voltage input terminal.

18. A pressure sensor circuit according to claim 17 wherein said another different voltage potential corresponds to ground potential.

19. A pressure sensor circuit according to claim 17 which includes a pair of selectable resistors a second one of which is connected between said second sensor applied voltage input terminal and said second input terminal of said first operational amplifier and a first one of said pair of selectable resistors connected between said first sensor applied voltage input terminal and said second input terminal of said first operational amplifier, said pair of selectable resistors determining the temperature coefficient of the offset of said desired pressure related output signal with respect to said first and second sensor voltage signals.

20. A pressure sensor circuit according to claim 19 wherein said offset adjustment resistor means includes a first offset adjustment resistor connected between ground potential and said second input terminal of said second operational amplifier and a second offset adjustment resistor connected between a source of voltage potential other than ground potential and said second input terminal of said second operational amplifier, wherein said offset adjustment resistors determine a desired absolute offset for said desired pressure related output signal with respect to said first and second sensor voltage signals.

21. A pressure sensor circuit according to claim 20 wherein a resistor couples the output of said first operational amplifier to the second input terminal of said second operational amplifier, said feedback resistor and said coupling resistor determining the gain of said second operational amplifier.

22. A pressure sensor circuit according to claim 21 wherein said second input terminal of said second operational amplifier is an inverted input terminal.

23. A pressure sensor circuit according to claim 13 wherein said second input terminal of said second operational amplifier is an inverted input terminal.

24. A pressure sensor circuit according to claim 13 wherein said offset adjustment resistor means includes a first offset adjustment resistor connected between one voltage potential and said second input terminal of said second operational amplifier and a second offset adjustment resistor connected between another voltage potential other than said one voltage potential and said second input terminal of said second operational amplifier, wherein said offset adjustment resistors determine a desired absolute offset for said desired pressure related output signal with respect to said first and second sensor voltage signals.

* * * * *